Patented Sept. 23, 1941

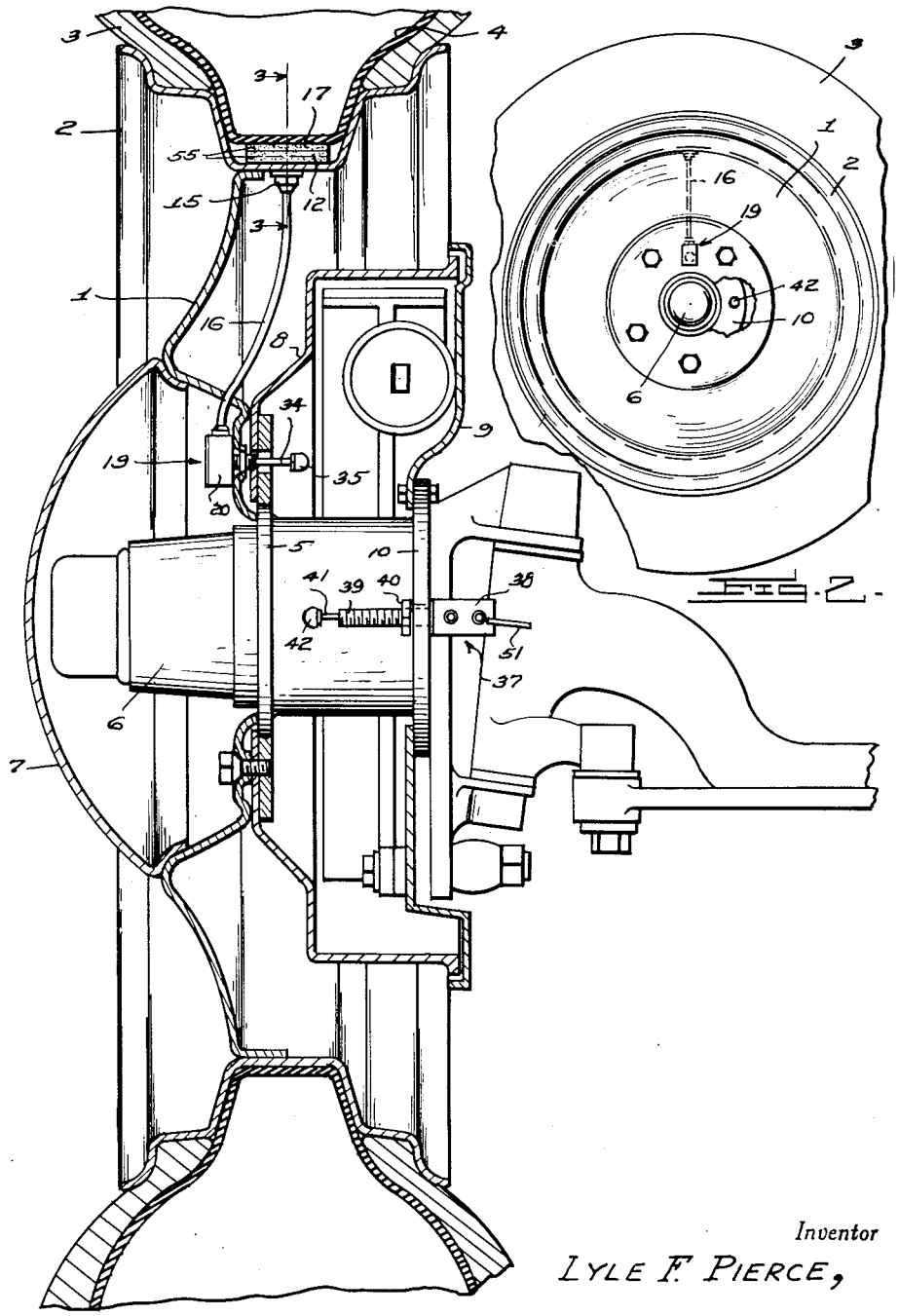

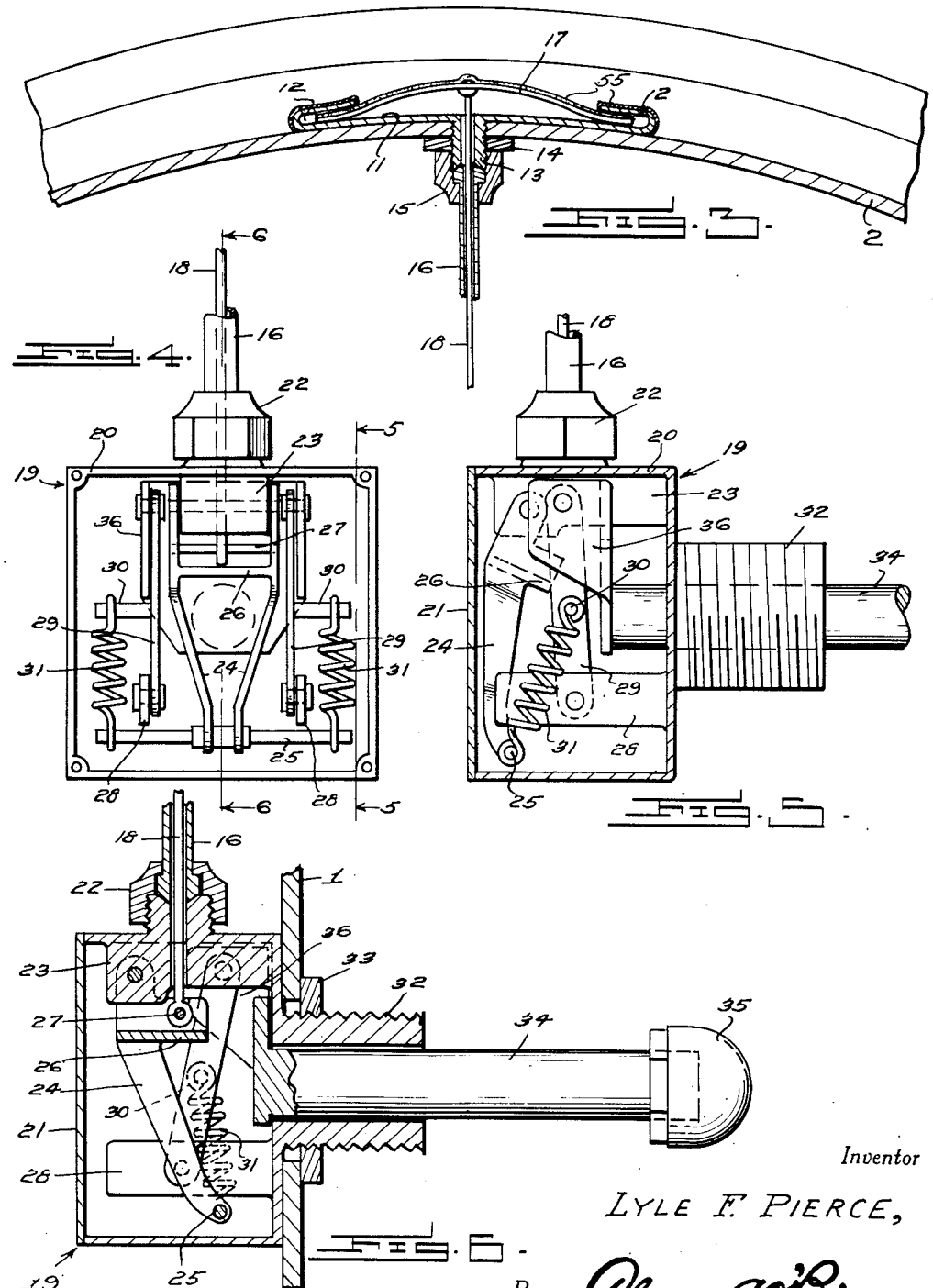

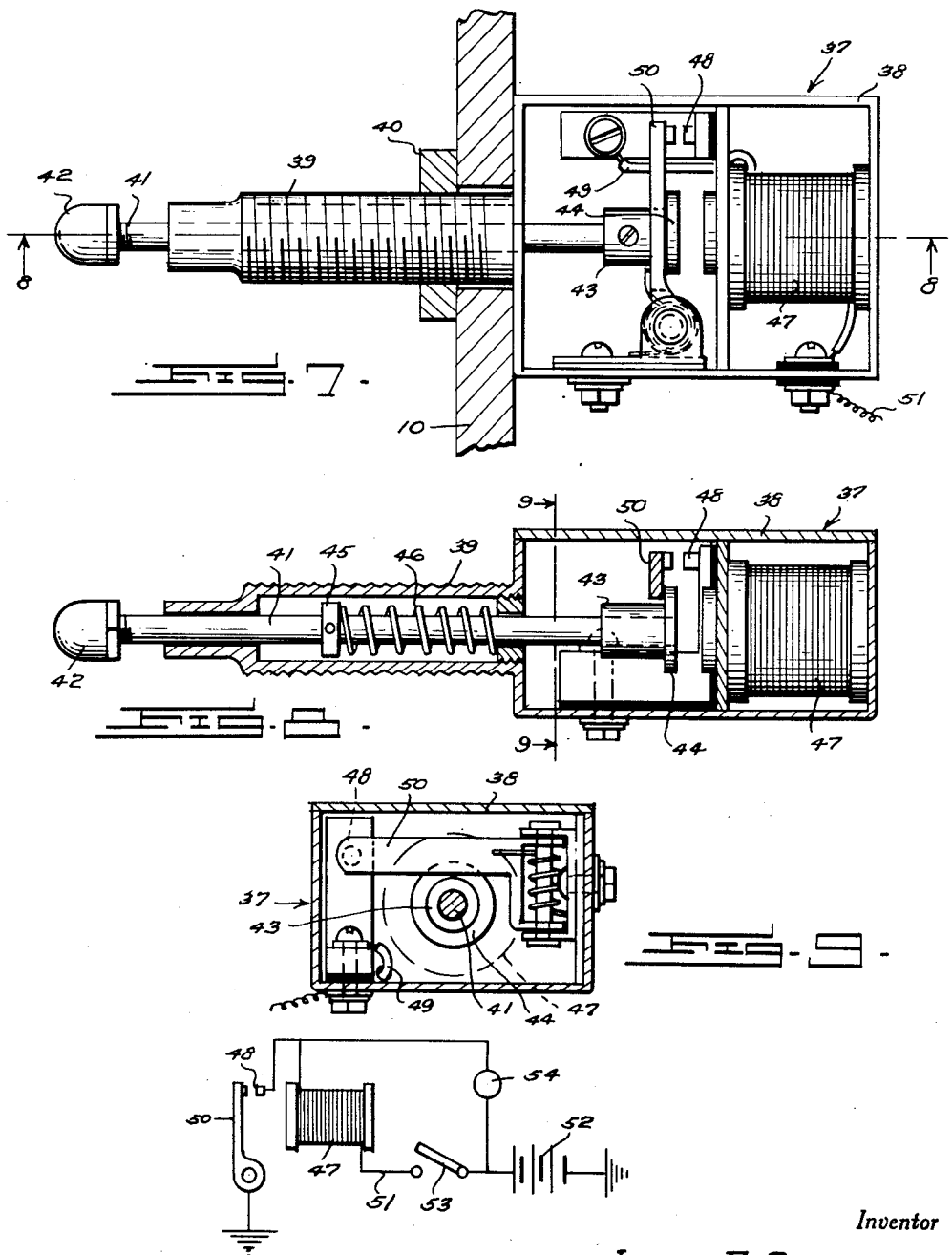

2,256,688

UNITED STATES PATENT OFFICE 2,256,688

TIRE INFLATION SIGNAL

Lyle F. Pierce, Santa Cruz, Calif.

Application February 16, 1940, Serial No. 319,362

3 Claims. (Cl. 200—58)

The present invention relates to new and useful improvements in tire deflation signals for vehicles and has for its primary object to provide, in a manner as hereinafter set forth, novel means for automatically indicating to the driver of the vehicle when the inflation of a pneumatic tire thereon falls belows a predetermined pressure.

Another very important object of the invention is to provide novel electromagnetic means for controlling the signal or indicator, said electromagnetic means, in turn, being controlled in its operation by the air pressure in the tire.

Other objects of the invention are to provide an automatic tire deflation signal of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical section through a vehicle wheel equipped with a signalling apparatus constructed in accordance with the present invention.

Figure 2 is a view in side elevation of the wheel with the hub cap removed, portions of the wheel being broken away to expose the magnetic switch device.

Figure 3 is a view in vertical section through a portion of the wheel rim, showing the pressure controlled spring device therein.

Figure 4 is an elevational view of the plunger unit with the cover plate removed from the casing.

Figure 5 is a view in vertical section, taken substantially on the line 5—5 of Figure 4 but with the cover plate in position on the casing.

Figure 6 is a view in vertical section, taken substantially on the line 6—6 of Figure 4.

Figure 7 is a top plan view of the magnetic switch unit with the cover plate removed from the casing.

Figure 8 is a vertical longitudinal sectional view, taken substantially on the line 8—8 of Figure 7.

Figure 9 is a cross sectional view, taken substantially on the line 9—9 of Figure 8.

Figure 10 is a diagrammatic view of the wiring system.

Referring now to the drawings in detail, it will be seen that the reference numeral 1 designates a front automobile wheel having a rim 2 on which a pneumatic tire 3 is mounted. The reference numeral 4 designates the inner tube of the tire 3. The wheel 1 is removably secured in the usual manner to the flange 5 of the hub 6. The usual removable hub cap is designated by the reference numeral 7. Also fixed in the usual manner to the flange 5 is a brake drum 8. The stationary back plate 9 of the brake is mounted on the usual flange 10 of the spindle.

Mounted circumferentially in the drop center portion of the rim 2 is a metallic plate 11. The plate 11 terminates in reversed end portions 12. A tubular stem 13 on the plate 11 passes through the rim 2 and has threaded thereon a securing nut 14. A coupling nut 15 secures one end of a tubular housing 16 to the stem 13. Mounted on the plate 11 and having its end portions slidably engaged therewith beneath the reversed portions 12 is a bowed spring 17. A flexible rod 18 is operable in the tubular housing 16 and has one end attached to the intermediate portion of the bowed spring 17.

Mounted on the inner portion of the wheel 1 and concealed by the hub cap 7 is a plunger unit which is designated generally by the reference numeral 19. The unit 19 comprises a casing 20 to which access is had through the medium of a removable cover plate 21. One end of the tubular housing 16 is connected, as at 22, to the casing 20, said tubular housing passing through an opening provided therefor in the wheel 1.

Formed on one of the walls of the casing 20 is a rib or lug 23. Mounted for swinging movement on the lug 23 is a fork 24 having mounted on its free end portion a rod 25. The inner or bight portion of the fork 24 comprises a substantially U-shaped bracket 26 having mounted therein a pin 27 (see Fig. 6) to which one end of the flexible rod 18 is connected. Thus, the fork 24 is connected to the spring 17 for actuation thereby.

Also, mounted in the casing 20 is a pair of arms 28 to which one end of a pair of toggle links 29 are pivotally connected. Projecting from intermediate portions of the links 29 are pins 30. Coil springs 31 connect the pins 30 to the pin 25.

The casing 20 is provided with a threaded nipple 32 which, in the embodiment shown, receives a nut 33 for securing said casing in position. Slidably mounted in the nipple 32 is a metallic plunger 34 having a substantially rounded head 35 on one end. On the other end of the plunger 34 and operable in the casing 20 is a substantially U-shaped member 36 to which the free ends of the links 29 are pivotally connected.

Mounted on the stationary flange 10 is a magnetic switch unit which is designated generally by the reference numeral 37. Referring to Figs. 7, 8 and 9 of the drawings, it will be observed that the unit 37 includes a casing 38 which is secured in position through the medium of an externally threaded guide 39 which is provided with a retaining nut 40. Extending slidably through the guide 39 is a stem 41 having on one end portion a head 42. The other end portion of the stem 41 extends into the casing 38 and has mounted thereon a metallic sleeve 43 having a flange 44 on its inner end. A collar 45 is adjustably secured on the stem 41 in the guide 39. A coil spring 46 in the guide 39 has one end engaged with the collar 45 for yieldingly urging the stem 41 outwardly.

Mounted in the casing 38 in opposed relation to the flanged end 44 of the sleeve 43 is an electromagnet 47. One side of the magnet 47 is electrically connected with a stationary contact 48 in the casing 38. This connection is indicated at 49. The reference numeral 50 designates a spring actuated, swinging ground contact which is engageable with the contact 48.

Referring to Figure 10 of the drawings, it will be observed that the magnet 47 is electrically connected, as at 51, with a source of current, such as the usual storage battery 52 of the vehicle. A hand control switch 53 is interposed in the line 51. The reference numeral 54 designates a signal light or indicator electrically connected with the storage battery 52 and with the stationary contact 48.

It is thought that the operation of the apparatus will be readily apparent from a consideration of the foregoing. When the tire of the vehicle is properly inflated the spring 17 is substantially flattened out by the pressure in said tire and the plunger 34, together with the elements in the casing 20, are in the position illustrated in Figure 5 of the drawings. Also, the stem 41 is in projected position, as seen in Figs. 7 and 8 of the drawings. Now, as the pressure in the tire decreases the spring 17 flexes outwardly and the rod 18 swings the fork 24 from the position shown in Figure 5 of the drawings to that illustrated in Figure 6 of said drawings. As the fork 24 swings past dead center the coil springs 31 which, of course, are under tension, snap the links 29 to the position shown in Figure 6 of the drawings thus projecting the plunger 34. With the plunger 34 in projected position the head 42 on the stem 41 is in the path of the head 35 on said plunger. Thus, as the wheel turns the head 35 engages the head 42 and forces the stem 41 inwardly against the tension of the comparatively light spring 46. Attention is here invited to the fact that the flange 44 is engaged with the swinging contact arm 50 and normally holds this contact in open or inoperative position. As the stem 41 is moved inwardly the flange 44 permits the contact 50 to engage the contact 48 which, with the switch 53 closed, completes the circuit which energizes the magnet 47. This also completes the circuit which energizes the signal light or indicator 54. When the magnet 47 is thus energized the metallic sleeve 43 with the flange 44 thereon is attracted thereto thereby holding the stem 41 in retracted position against the tension of the coil spring 46, in which position the head 42 is out of the path of the head 35 on the plunger 34. When the tire is again properly inflated the spring 37 is substantially flattened out or straightened and the rod 18 returns the elements in the casing 20 from the position shown in Figure 6 of the drawings to that illustrated in Figure 5 thereby retracting the plunger 34. The switch 53 is then opened for deenergizing the magnet 47, thus freeing the stem 41 which is returned to projected position by the spring 46, the flange 44 opening the contacts 48 and 50 for extinguishing the light 54 and opening the electric circuit of said magnet when the switch 53 is again closed. The elements 12 and 17 are provided with cushions 55 of suitable material, such as sponge rubber, for protecting the inner tube 4.

It is believed that the many advantages of an automatic tire deflation signal constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A tire pressure signal control switch actuator comprising a casing mounted on a vehicle wheel, a fork pivotally mounted in said casing, a plunger extending slidably into the casing, toggle links mounted for swinging movement in the casing and pivotally connected to the plunger, springs connecting said toggle links to the fork for actuation thereby, and means operable by the pressure in a tire for actuating the fork for projecting the plunger.

2. A tire pressure signal control switch actuator comprising a casing mounted on a vehicle wheel, a plunger extending slidably into the casing, a substantially U-shaped member on the inner end of the plunger operable in the casing, toggle links mounted for swinging movement in the casing and having one end portion pivotally connected to the substantially U-shaped member, a member mounted for swinging movement in the casing, resilient means connecting the links to said member for actuation thereby for projecting and retracting the plunger, and means operable by the pressure in a tire on the wheel for actuating said member.

3. A tire pressure signal control means comprising an elongated plate, including reversed end portions, mounted circumferentially on a wheel rim, a bowed spring mounted on the plate and having its end portions slidably engaged beneath the reversed end portions of said plate, said spring being operable by the pressure in a pneumatic tire on the rim, and a rod connected to the spring at an intermediate point for actuation by said spring.

LYLE F. PIERCE.